United States Patent Office 3,097,908
Patented July 16, 1963

3,097,908
DYEINGS AND PRINTS POSSESSING FASTNESS TO WET PROCESSING AND THEIR MANUFACTURE ON CELLULOSE MATERIALS AND PROTEIN FIBERS
Karl Jellinek, Offenbach (Main), and Thomas Hegedüs, Hans Ulmer, and Hugo Bartl, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 26, 1960, Ser. No. 45,277
Claims priority, application Germany Mar. 16, 1960
11 Claims. (Cl. 8—22)

The present invention relates to dyeings and prints possessing fastness to wet processing and their manufacture on cellulose materials and protein fibers.

It is known to use compounds of sulfur dyestuffs and alkali sulfites for dyeing and printing cotton in the presence of alkalies or sulfur alkalies (cf. German patent specifications Nos. 88,392; 91,720 and 94,501) or in the absence of alkalies and reducing agents at raised temperatures (cf. German patent specification No. 1,004,586). The aforesaid compounds are presumably sulfur dyestuffs containing thiosulfate groups.

U.S. patent application Serial No. 23,139, filed on April 19, 1960, by Werner Schultheis, Kurt Schimmelschmidt, Hermann Hoffmann, Edwin Baier and Albert Bode discloses a process for producing dyeings and prints fast to wetness on shaped structure consisting of natural or regenerated cellulose, wherein the said shaped structures are treated with an alkaline agent or an alkaline reducing agent, for example, sodium sulfide, during or after the dyeing, padding or printing of the said structures with a water-soluble organic dyestuff which contains one or more thiosulfuric acid groups and which may contain further hydrosolubilizing groups, with the exception of a sulfur dyestuff.

We have now found that fast prints and dyeings can be produced with any of the above-mentioned water-soluble organic dyestuffs which contain one or more thiosulfuric acid groups and which may contain further hydrosolubilizing groups—with the exception of sulfur dyestuffs—on shaped structures of natural or regenerated cellulose, protein fibers or mixtures thereof by treating the material before, during or after the application of the dyestuffs with elementary sulfur, preferably very finely ground or colloidal sulfur, if desired, in the presence of substances which in an aqueous medium have an alkaline reaction or yield hydroxyl ions and by subsequently fixing the resulting dyeings and prints in usual manner at an elevated temperature so as to attain good fastness properties.

The aforesaid fixation of the dyestuffs containing the thiosulfuric acid groups is in general brought about in the following way: The prints or dyeings which are first prepared but which have not yet been fixed and which contain the elementary sulfur are subjected to a heat treatment at an elevated temperature, for example, a steaming process or a treatment with hot air.

The steaming can be carried out in the usual manner in a continuous steaming apparatus or, for example, in a star steamer, advantageously at temperatures within the range of about 100° C. to 110° C. The treatment with hot air, i.e. a dry heating, is suitably brought about by heating for 1 to 10 minutes to temperatures within the range of about 100° C. to 180° C. When the material is heated for a short time the temperature must be higher than in cases in which the material is heated for a longer period.

The water-soluble dyestuffs containing one or more thiosulfuric acid groups, which are suitable for use in the process of the present invention may, for example, belong to the azo, anthraquinone, vat, acridone, phenazine, dioxazine, diphenyl-methane, triphenyl-methane, nitro or phthalocyanine series. The thiosulfuric acid groups may be directly bound to the aromatic nucleus of the dyestuff molecule or via a bridge consisting of an aliphatic or aromatic hydrocarbon radical which, if desired, may be substituted or interrupted by hetero atoms. If desired, the dyestuffs may contain, in addition to thiosulfuric acid groups, further groups imparting solubility in water, such, for example, as sulfonic or carboxylic acid groups. They may be prepared, for example, by coupling diazotized aromatic amines containing thiosulfuric acid groups with any desired coupling components which, on their part, may contain thiosulfuric acid groups, or by condensing dyestuffs containing reactive halogen atoms with aliphatic or aromatic amines containing thiosulfuric acid groups.

It is suitable to treat the substratum with a solution, padding liquor or printing paste containing both dyestuff and sulfur. Alternatively, the material can be treated with elementary sulfur before or after printing or dyeing. The sulfur may also be admixed with the dyestuff in the course of its fabrication already. In the latter case the addition of sulfur to the padding liquor or the printing paste may be dispensed with.

The pretreatment of the material to be printed or dyed can, for example, be carried out in the following way: The tissue is padded with a padding liquor containing finely divided sulfur and dilute sodium hydroxide solution. It is then dried and printed with a printing paste containing the dyestuff. After the drying the material is steamed in usual manner until it is neutral.

The aftertreatment may, for example, be carried out as follows: The material is first printed with a dyestuff containing printing colour, then dried intermediately and finally slop-padded with a sulfur-containing padding liquor which, if desired, is alkaline. After drying it is steamed in usual manner until it is neutral.

As compounds which in an aqueous medium have an alkaline reaction or yield hydroxyl groups there may be added in the process of the invention, for example, sodium hydroxide, sodium bicarbonate and the sodium salt of trichloracetic acid.

The dyeings and prints which have been prepared by the process of the invention excel the dyeings and prints produced with the known compounds of sulfur dyestuffs and alkali sulfites in their fastness to wet—this is in particular true of the dyeings and prints produced with those of the dyestuffs to be used in the process of the invention which do not contain any water-solubilizing group in addition to the thiosulfuric acid groups—as well as in their brilliancy.

The use of elementary sulfur has many advantages over the addition of sodium sulfide which at room temperature forms sparingly soluble deposits with some of the dyestuffs containing thiosulfuric acid groups. It is, for example, possible to add the elementary sulfur to the printing colours and padding liquors without running the risk that they form a deposit with the dyestuff used, for the printing colours and padding liquors thus prepared are completely stable at room temperature. The above-mentioned compounds are consequently particularly suitable for dyeing processes using one bath and in particular for the printing of textiles. Besides, the direct addition of the elementary sulfur to the printing colour and the stability of the printing colour at room temperature which is not influenced by the addition of the elementary sulfur enable the dyestuffs used which contain thiosulfuric acid groups to be applied together with dyestuffs of other classes. Owing to this fact the field in which the dyestuffs containing sulfuric acid groups may be applied in the textile printing industry is enlarged. Moreover, the elementary sulfur may partially be used for the permanent fixation of the above-mentioned dyestuffs without the addition of a substance giving an alkaline reaction or a compound having but a weakly alkaline reaction, for example, sodium bicarbonate or the sodium salt of trichloracetic acid. This is of importance with respect to the sensibility to alkali of protein fibers such as wool and silk.

The prints and dyeings that can be produced by the process of the present invention on shaped structures of cellulose materials and protein fibers or mixtures thereof distinguish themselves by good fastness properties.

The following examples serve to illustrate the invention but they are not intended to limit it thereto.

*Example 1*

40 grams of a dyestuff which had been prepared by condensing copper phthalocyanine trisulfochloride with 3 mols of 2-aminoethyl thiosulfuric acid were stirred with 50 grams of urea and dissolved in 300 grams of hot water. After cooling to room temperature the solution was admixed with 400 grams of a neutral sodium alginate thickener of 4% strength. Subsequently 20 grams of sodium bicarbonate and 20 grams of finely powdered sulfur were added. After an intimate mixing the printing colour was adjusted to 1 kilogram by the addition of alginate thickener or water. The printing colour was then printed in usual manner on cotton fabric, dried and steamed for 5 minutes until neutral. The material was then rinsed, soaped in hot water and rinsed again. A blue print of generally good fastness properties was obtained.

*Example 2*

40 grams of the dyestuff mentioned in Example 1 were stirred with 50 grams of urea and dissolved in 300 grams of hot water. After cooling to room temperature 400 grams of neutral sodium alginate thickener of 4% strength were introduced into the solution. Subsequently 40 grams of finely divided sulfur and 80 grams of a solution of 50% strength of the sodium salt of trichloracetic acid were added. The printing colour was mixed well and adjusted to 1 kilogram by the addition of water or alginate thickener. The printing colour thus obtained was printed in usual manner on cotton fabric, dried and steamed for 10 minutes until neutral. The subsequent treatment was carried out in the manner described in Example 1. A blue print of generally good fastness properties was obtained.

*Example 3*

20 grams of dyestuff mentioned in Example 1 and 50 grams of urea were dissolved in 400 grams of hot water. After the solution had been cooled to room temperature 10 grams of sodium bicarbonate, 10 grams of colloidal sulfur and 100 grams of sodium alginate thickener of 4% strength were added and the whole was adjusted to 1 kilogram by the addition of water. With the padding liquor thus obtained cotton fabric was padded at room temperature. After the padding the material was intermediately dried at a temperature within the range of 40° C. to 60° C., steamed for 10 minutes until neutral, rinsed cold and hot, soaped at the boil and rinsed again.

A blue padded dyeing of generally good fastness properties was obtained.

*Example 4*

5 to 30% by weight of finely divided sulfur were admixed with the dyestuff mentioned in Example 1 during its preparation.

30 grams of the resulting mixture were stirred with 50 grams of urea and 200 grams of hot water until the dyestuff was completely dissolved and the resulting solution thickener of 4% strength. After cooling to room temperature 80 grams of a solution of 50% strength of the sodium salt of trichloracetic acid were added. The whole was adjusted to 1 kilogram by the addition of water or alginate thickener. The printing colour was printed in usual manner on a chlorinated wool fabric (wool muslin). The printed material was dried and steamed for 10 minutes until neutral. After a thorough cold and hot rinsing at a temperature within the range of 50° C. to 60° C. a fine blue print of good fastness properties was obtained.

Similar results were obtained when tissue of natural silk was printed with the same printing colour and subjected to the same aftertreatment.

*Example 5*

30 grams of the dyestuff of the following formula

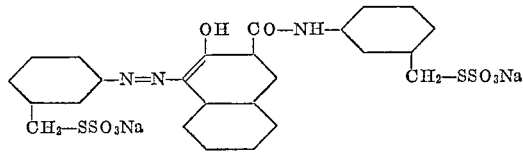

were dissolved with 50 grams of urea and 250 grams of hot water. After cooling to room temperature 500 grams of neutral sodium alginate thickener of 4% strength and 15 grams of sodium bicarbonate were added to the solution. The mixture was thoroughly stirred and 3 grams of finely divided sulfur were added. The printing colour was adjusted to 1 kilogram by the addition of water or sodium alginate thickener while mixed well. The printing colour which was then obtained was printed in known manner on cotton, dried and steamed for 5 minutes until neutral. The material was then rinsed cold and hot, soaped in hot water and rinsed again. A scarlet print of good wet fastness properties was obtained.

Beautiful prints can likewise be obtained when the printing colour described in this example is printed on chlorinated wool.

*Example 6*

30 grams of the dyestuff of the formula

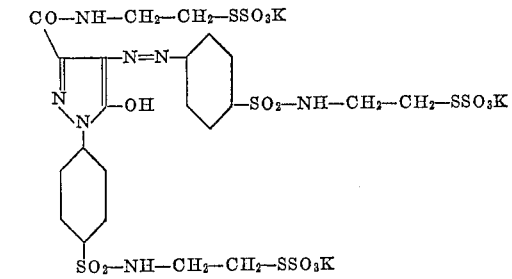

were dissolved in 250 grams of hot water with the addition of 50 grams of urea. The solution was admixed with 500 grams of neutral sodium alginate thickener of 4% strength and 15 grams of sodium bicarbonate. Then 6 grams of finely divided sulfur were added and after thorough stirring the whole was adjusted to 1 kilogram by the addition of water or thickener. With the printing colour that had thus been prepared cotton was printed in usual manner. After printing and drying, the material was steamed for 5 minutes until neutral, rinsed cold and hot, soaped in hot water and rinsed again. A golden yellow print of a good fastness to wet was obtained.

With the same printing colour a good print could be produced on chlorinated wool.

*Example 7*

White mercerized cotton was padded at 50° C. with a liquor containing 10 grams of very finely divided sulfur, 20 grams of sodium hydroxide solution of 32.5% strength, 870 grams of water of 50° C. and 100 grams of neutral sodium alginate thickener of 4% strength. After the material that had thus been pretreated had dried it was printed with a printing paste which had been prepared in the following way:

30 grams of the dyestuff mentioned in Example 5 were stirred with 50 grams of urea and dissolved with 250 grams of hot water. After cooling 500 grams of neutral sodium alginate thickener of 4% strength were added and, while stirring, the printing colour was adjusted to 1 kilogram by the addition of thickener or water. After printing and drying the material was steamed for 5 minutes of the dyestuff described in Example 6 were used. A fine golden yellow print fast to wet was obtained.

*Example 8*

The experiment was carried out under exactly the same conditions as Example 7 with the exception that 30 grams of the dyestuff in Example 6 were used. A fine golden yellow print fast to wet was obtained.

*Example 9*

A white mercerized cotton fabric was printed in one case with the printing colour mentioned in Example 7 and in another case with the printing colour mentioned in Example 8. After drying the print was slop-padded with the sulfur-containing liquor described in Example 7. The material which had thus been aftertreated was dried, steamed for 5 minutes until neutral, rinsed, soaped at the boil and rinsed again. Scarlet and golden yellow prints, respectively, were obtained which had a good fastness to wet.

*Example 10*

The dyestuff mentioned in Example 1 was combined during its fabrication already with 30% by weight of finely divided sulfur.

30 grams of the resulting mixture were stirred with 50 grams of urea and 250 grams of hot water until the dyestuff was dissolved. Then 500 grams of neutral sodium alginate thickener of 4% strength were admixed with the solution and after cooling to room temperature 15 grams of sodium bicarbonate were added. The whole was adjusted to 1 kilogram by the further addition of water or alginate thickener, while stirring thoroughly. The printing colour which had thus been prepared was printed in usual manner on a cotton fabric. After printing and drying the material was subjected for 1 to 2 minutes to a thermofixation at 120° C. on a stretching frame. (The thermofixation may also be carried out by heating the material for 1 to 5 minutes at a temperature within the range of 100° C. to 140° C., the best results being, however, obtained when operating in the manner described in this example.) Subsequently the material was rinsed cold and hot, soaped at the boil and rinsed again. A fine blue print of generally good fastness properties was obtained.

We claim:

1. The process for producing wet-fast dyeing and prints on shaped articles of a material selected from the group consisting of cellulose and native protein and mixtures thereof which comprises treating said shaped articles with dispersed elementary sulfur and a water-soluble organic dyestuff selected from the group consisting of phthalocyanine dyestuffs, metal-phthalocyanine dyestuffs, azo-dyestuffs and pyrazolone-dyestuffs containing at least one thiosulfuric acid group bound to a carbon atom of an aromatic nucleus thereof through a member of the group consisting of $-CH_2-$, $-SO_2-NH-$lower alkylene, $$-SO_2-N-\text{lower alkylene}$$
$$|$$
$$\text{lower alkyl}$$

and $-CO-NH-$lower alkylene, and subsequently subjecting the resulting dyeings and prints to a permanent fixation at an elevated temperature.

2. The process as claimed in claim 1, wherein colloidal sulfur is used as dispersed elementary sulfur.

3. The process as claimed in claim 1, wherein the treatment with dispersed elementary sulfur is carried out in the presence of a compound selected from the group consisting of sodium hydroxide, sodium bicarbonate and the sodium salt of trichloracetic acid.

4. The process as claimed in claim 1, wherein the dyestuffs used contain besides the thiosulfuric acid groups further groups imparting solubility in water selected from the group consisting of the sulfonic acid group and carboxyl group.

5. The process as claimed in claim 1, wherein the treatment with the dispersed elementary sulfur is carried out before the application of one of said dyestuffs by means of a padding liquor containing the dispersed sulfur.

6. The process as claimed in claim 1, wherein the treatment with the dispersed elementary sulfur is carried out after the application of one of said dyestuffs by means of a padding liquor containing the dispersed sulfur.

7. The process as claimed in claim 1, wherein the treatment of said shaped articles with the dispersed elementary sulfur and one of said dyestuffs is carried out by means of a padding liquor containing both the dispersed sulfur and the dyestuff.

8. The process as claimed in claim 1, wherein the treatment of said shaped articles with the dispersed elementary sulfur and one of said dyestuffs is carried out by means of an aqueous solution containing both the dispersed sulfur and the dyestuff.

9. The process as claimed in claim 1, wherein the treatment of said shaped articles with the dispersed elementary sulfur and one of said dyestuffs is carried out by means of a printing paste containing both the dispersed sulfur and the dyestuff.

10. The process as claimed in claim 1, wherein said water-soluble organic dyestuffs containing at least one thiosulfuric acid group are permanently fixed on said shaped articles by steaming at a temperature between about 100° C. and 110° C.

11. The process as claimed in claim 1, wherein said water-soluble organic dyestuffs containing at least one thiosulfuric acid group are permanently fixed on said shaped articles by treatment with hot air at a temperature between about 100° C. and 180° C.

References Cited in the file of this patent

UNITED STATES PATENTS

| | | |
|---|---|---|
| 2,180,805 | Felix et al. | Nov. 21, 1939 |
| 2,245,171 | Felix et al. | June 17, 1941 |
| 2,670,265 | Heyna et al. | Feb. 23, 1954 |
| 2,895,785 | Alsberg et al. | July 21, 1959 |